Oct. 4, 1927.
C. H. SEMPLE
1,643,999
METHOD AND APPARATUS FOR MAKING TUBES
Filed Oct. 9, 1926  2 Sheets-Sheet 1
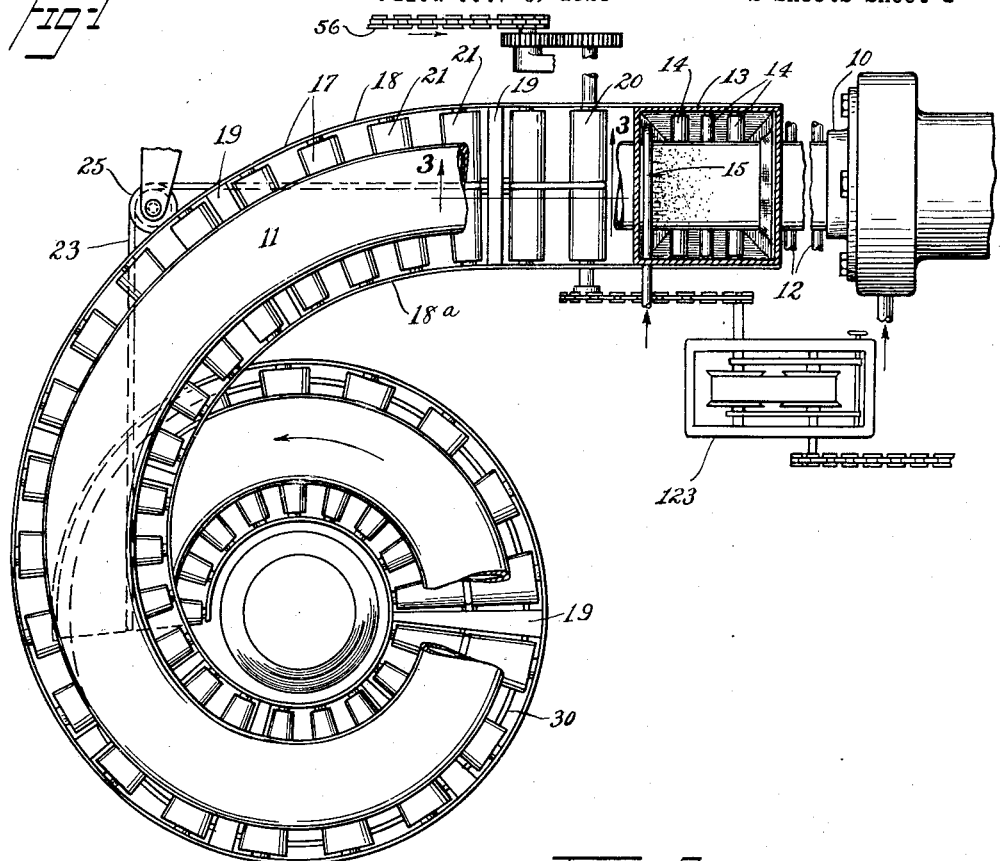
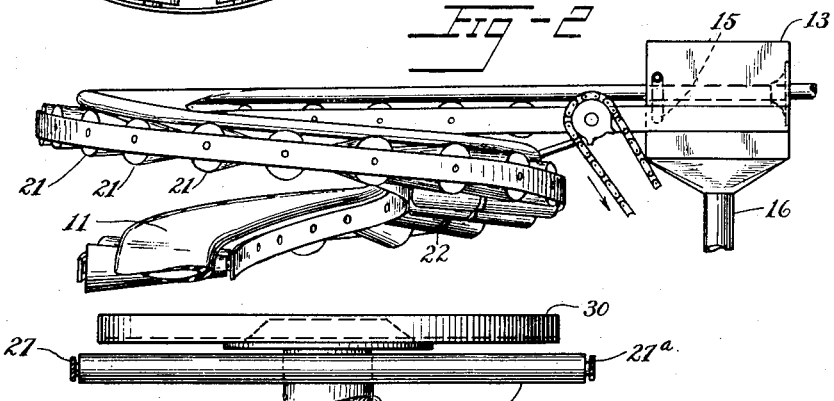
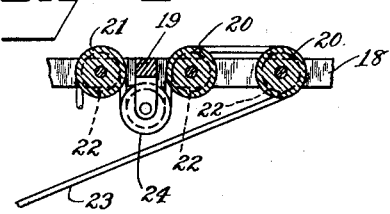
Inventor
Charles H. Semple
By Willard D. Eakin
Atty.

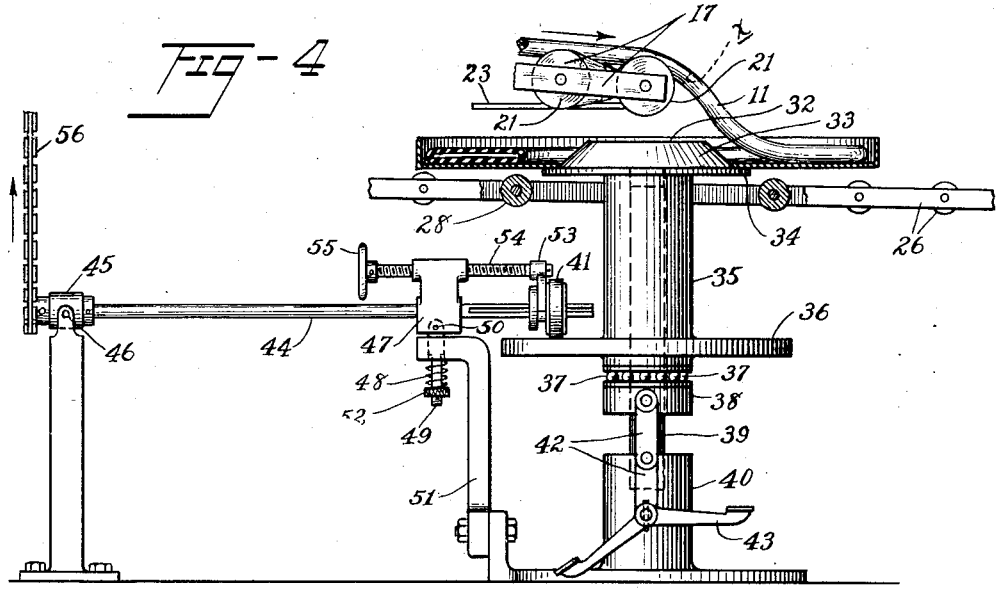
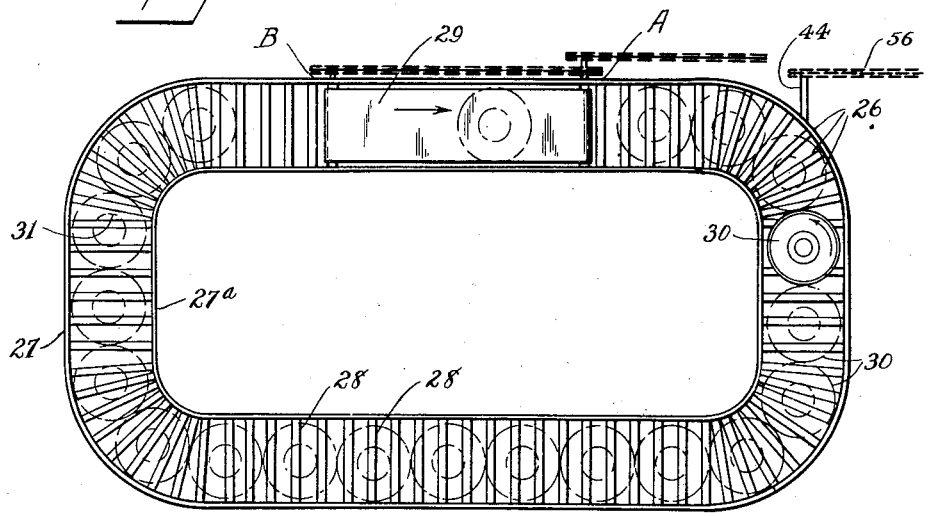

Patented Oct. 4, 1927.

1,643,999

UNITED STATES PATENT OFFICE.

CHARLES H. SEMPLE, OF CANTON, OHIO, ASSIGNOR TO SEMPLE-LEE PROCESSES, INC., OF AKRON, OHIO, A CORPORATION OF DELAWARE.

METHOD AND APPARATUS FOR MAKING TUBES.

Application filed October 9, 1926. Serial No. 140,564.

This invention relates to the art of making annular tubes, such as inner tubes for pneumatic tires, for example. Its general object is to provide improved procedure and apparatus for so handling tubular stock, as the latter issues from a tubing machine, for example, as to give it, while it is hot and plastic, approximately the longitudinal curvature which it is to have in the finished tube, so that the stock will take such curvature without buckling of the material on the inner side of the curve and without excessive stretching and thinning of the material at the outer side of the curve.

More specific objects are to provide for giving curvature to the stock as described and cutting successive lengths therefrom in a continuous operation, to provide for an appreciable cooling of the stock as an intermediate step in such a continuous operation, and to provide improved procedure and apparatus whereby the successive lengths of stock may be severed and removed from the vicinity of the continuous tubular strip of stock without unduly interfering with the steady forward movement of the residue of the strip.

A further object is to provide for delicate handling and regular and accurate progressive bending of the continuous tubular strip while it is in a warm and highly plastic condition. Another object is to provide for accurately regulating the speed with which the stock is withdrawn from the forming means so that proper uniform weight or gauge and accurate curvature of the stock may readily be obtained.

Other, more detailed, objects will be manifest.

Of the accompanying drawings:

Fig. 1 is a plan view of apparatus embodying and adapted to carry out my invention in its preferred form.

Fig. 2 is an elevation of parts of the same, a part being shown in section.

Fig. 3 is a section on line 3—3 of Fig. 1.

Fig. 4 is an elevation of parts of the apparatus, from the left of Fig. 2, parts being sectioned and broken away.

Fig. 5 is a plan view of a conveyor constituting a part of the apparatus.

Referring to the drawings, 10 is the nozzle of a tubing machine which is adapted to form a continuous tube 11 of rubber stock and which may be provided with the usual means including a hollow mandrel for soapstoning the inside of the tubed stock. A set of closely spaced idler supporting rollers 12, 12 are mounted in position to support the extruded tube as the latter is drawn from the nozzle into a soapstoning box 13, which is preferably positioned about eighteen inches from the nozzle, so that the tube may have a substantially straight reach of some length for a slight elongation and flattening down of the strip and elimination of waves in the stock thereof before it is drawn into its subsequent curved path.

The soapstoning box 13 is formed with suitable inlet and outlet openings for the passage of the tube therethrough and is provided at a distance above its bottom with closely spaced idler supporting rollers 14, 14 adapted to support the tube as the latter passes through the box, the spacing apart of the rollers permitting the under as well as the upper side of the tube to receive soapstone from an annular soapstoning ring 15 mounted in the box, in position for the tube to pass through the ring, the ring being perforated on its inner periphery and connected with suitable means for blowing soapstone therethrough onto the tube. An outlet spout 16, leading to a suitable suction device, is provided for withdrawing the excess soapstone from the box.

Mounted at the delivery side of the soapstoning box 13 is a downwardly spiraled conveyor 17 adapted to draw the continuous tubular strip through the soapstoning box and to feed the strip through a path such as gradually to impart to the strip a curvature such as is desired in the finished tube and further to feed the strip for an appreciable cooling thereof while maintaining in it a curvature of the same radius.

The conveyor 17 comprises a pair of spiral side frames 18, 18ª connected by spacer bars 19, 19, and having journaled between them a pair of parallel, cylindrical conveyor rollers 20, 20 and a series of conveyor rollers 21, 21 which are tapered toward the inside of the curved conveyor so that the necessary relative speeds will be imparted to the inner margin and the outer margin of the flattened tubular strip to impart gradually to the strip the desired curvature.

Each of the rollers 20, 21 is formed at its middle with a belt groove 22 to receive a drive belt 23 which is mounted upon and is common to all of the rollers, and the initial cylindrical roller 20, constituting the drive roller for the belt, has driving connection, through a variable speed device 123, which may be of well known construction, with a suitable source of power such as the gearing of the tubing machine.

To guide the belt 23 so that it will have sufficient driving contact with the several rollers a guide sheave 24 is mounted just below each alternate space between successive rollers of the series, the belt 23 being threaded along through the series of supporting rollers 20, 21 and guide sheaves 24 as is clearly shown in Fig. 3, and returning from the delivery end of the series to the initial roller 20 by way of a guide sheave 25, Fig. 1.

Mounted with a part thereof under the delivery end of the spiral conveyor 17 is an annular conveyor 26 comprising a pair of side frames 27, 27ª, having journaled between them a series of idler supporting rollers 28, 28 constituting from the point A to the point B, Fig. 5, a gravity conveyor of such moderate slope that a slight push is required to propel the work thereon and in the space from the point B to the point A is mounted an inclined endless belt conveyor 29 adapted to receive by gravity from the rollers 28 at point B and carry upward to the point A and there deliver onto the gravity rollers 28 successive tube-receiving pans 30, 30 which are mounted upon the gravity rollers in such number as nearly to fill the conveyor throughout its length.

Each tube-receiving pan 30 is formed with a central, circular opening 31 in its floor and immediately under the delivery end of the spiral conveyor 17 the two adjacent gravity rollers 28 are spaced apart sufficiently to admit the passage between them of a lifting head 32 adapted to be raised to lift a pan from the rollers 28 to hold it and rotate it while it is out of contact with the rollers, and then to be lowered to re-deposit the pan upon the rollers and withdraw downward to clear the pan as the latter moves on, the lifting head being formed with a tapered portion 33 adapted to enter the central opening 31 in the floor of the pan to center the pan and with a flange 34 at the base of the said tapered portion and adapted to engage the pan to support it.

The head is formed upon an elongated, axially bored hub 35 having at its lower end a drive disk 36 and below that formed with a thrust-bearing ball race adapted to rest upon a set of bearing balls 37, 37 mounted upon a thrust bearing member 38, the member 38 being slidably mounted upon a spindle 39 which rises from a standard 40 and extends through the bearing member 38 into the central bore of the hub 35 to support the latter in an upright position while permitting it to be raised and lowered by the raising and lowering of the bearing member 38, and to be rotated when in its high position, by a friction drive roller 41. For raising and lowering the bearing member 38 the latter is connected by an over-center toggle 42 with a two-armed foot-lever 43.

In order that the speed of rotation of the head 32 and pan 30 thereon may be properly timed for the progressive reception of the curved tubular stock from the spiral conveyor 17 into the pan the friction drive roller 41 is splined on a shaft 44 which is journaled in a bearing member 45 pivoted on a transverse, horizontal axis 46 and in a bearing member 47 urged downward, to provide friction of the drive roll 41 against the disk 36, by a compression spring 48 mounted on a stem 49 which is hinged at 50 to the bearing member 47 and projects downward through an aperture in an offset formed on a standard 51, the spring being interposed between the said offset and an adjusting nut 52 screwed onto the lower end of the stem.

For adjusting the drive roller 41 from and toward the axis of the friction disk 36 the roller is provided with a grooved hub engaged by a yoke 53 swiveled on the end of an adjusting screw 54 which is threaded through a part of the bearing member 47 and provided with a hand-wheel 55. The shaft 44 has driving connection through a sprocket chain 56 with a suitable source of power such as the driving gear of the tubing machine.

In the operation of the apparatus, proper adjustments being assumed, and the tubing machine, the spiral conveyor 17 and the friction drive roller 41 being continuously driven at suitable relative speeds, the tubed stock is continuously drawn through the soapstoning box and thus rendered non-adhesive and is fed into suitably curved form by the spiral conveyor 17 and is fed continuously from the delivery end of the latter.

An operator, by shoving adjacent pans 30 on the conveyor 26 brings one pan after another into position over the lifting head 32. As each pan is brought into that position he depresses the left arm of the foot lever 43 and thereby elevates the head to lift the pan from the conveyor and with it the friction disk 36 to bring the latter into contact with the rotating drive roller 41 and thus cause the pan to be rotated to receive from the conveyor 17 the leading portion of the tubed stock 11 in curved form.

When a suitable reach of the stock has been received in the pan, at which time the pan will have made nearly a complete revolution, the operator cuts off the said reach to suitable length, by means of a pair of shears, for example, as at the position indicated by the dotted line $x$ in Fig. 4, permitting the trailing part of the severed length to drop into its position in the pan, and then depresses the other arm of the foot lever 43 to lower the pan onto the conveyor 26 and withdraw the head, and then shoves the filled pan forward and brings the next empty pan into position over the head and repeats the operation as described. At another part of the conveyor 26 the tube lengths, permissibly with their pans, are removed therefrom for splicing and vulcanizing of the tubes, empty pans being substituted when the pans are removed with the tubes.

The conveyor 26 being nearly filled with the pans, the movement of the pans on the conveyor may be controlled by the operator by his handling of the pans at the tube-receiving station, and by moderately skillful operation he can substitute pans rapidly enough to permit the stock to be delivered continuously from the spiral conveyor 17 without waste of stock or undue distortion of the stock from its accurately curved form, the drive roller 41 being adjusted to give the proper rotating speed to the pans.

By means of the variable speed device 123 the speed of the spiral conveyor 17 may be so regulated as to impart a slight stretch to the tubed stock while the latter is still in substantially straight form adjacent the tubing machine, and thus give it proper gauge, uniformity and freedom from waviness imparted by the extruding die. Another advantage is that the tubular strip, being slightly stretched while in straight form, can be bent into curved form in substantial measure by subsequent elastic contraction of its inner margin while its outer margin remains extended, as distinguished from simultaneous forced compression of the inner margin and stretching of the outer margin, as in the case of bending an unstretched tube. This feature of bending in appreciable measure by elastic contraction of the inner margin is believed to be a considerable factor in the smooth, even bending of the strip, reducing the bending force necessary to be imparted to the strip by any single roller.

Moreover, the stock is gradually bent with a decreasing radius of curvature, by reason of the spiral form of the initial portion of the conveyor 17, and this avoids the necessity of applying very strong bending forces to the strip at any given position as compared with feeding the strip from a straight reach directly into a curved reach having the final, minimum radius of curvature.

Also the movement of the stock in the spiral conveyor is assisted by gravity, so that strong driving force in the rollers 20, 21 is not required and undesirable distortion of the stock is thus avoided.

The descent of the stock through the spiral path results in an appreciable cooling of the stock such as to give it a suitable form-sustaining stiffness to avoid undesirable permanent distortion in the subsequent handling of it.

The flattening down of the tubular strip by gravity before it is bent results in a comparatively large elongation of its outer margin and shortening of its inner margin in the bending operation, which is incident to the formation of an annular tube which is of axially flattened form in cross-section as vulcanized, as in the case of the tube described and claimed in my co-pending application Serial No. 85,735, filed February 3, 1926, and in the present invention this combined flattening and bending of the stock is effected while the stock is highly plastic, with obvious advantages.

Modifications are possible within the scope of my invention as defined in the appended claims.

I claim:

1. The method of making annular rubber tubes which comprises continuously forming a tubular strip of plastic rubber stock and feeding it from the forming position, continuously bending the strip by progression as it passes a position adjacent the forming position to give it approximately the longitudinal curvature desired in the finished annular tube, feeding the said strip continuously through a helical path from the position where it is so bent, and at the delivery end of said path cutting successive lengths from the strip substantially without stopping the forward feeding of the residue, the bending of the strip being effected by external engagement therewith, without full-section internal support of the tube at the bending position.

2. A method as defined in claim 1 in which the tubular strip progressively is stretched as it passes to the bending position.

3. A method as defined in claim 1 in which the tubular strip as it passes to the bending position is caused to assume a pronouncedly flattened form in cross section such that its greatest cross-sectional dimension as it passes into the helical path will be approximately at right angles to the axis of the helical path.

4. A method as defined in claim 1 in which the strip is gradually bent to a decreasing radius of curvature.

5. The method of making an annular rubber tube which comprises feeding a tubular strip of rubber stock through a path such that the strip is gradually bent to a decreasing radius of curvature.

6. Tube-making apparatus comprising means for continuously forming a tubular strip of plastic rubber stock and conveyor means adapted to feed the tubular strip from the forming means into helical form by external engagement with the strip and without full section internal support thereof and to deliver the strip continuously from the terminus of the conveyor means.

7. Tube-making apparatus as defined in claim 6 including means for driving the conveyor means at such speed with relation to the movement of the strip adjacent the forming means as progressively to impart a stretch to the strip.

8. Tube-making apparatus as defined in claim 6 including means for progressively applying an adhesion-preventing material to the exterior of the tubular strip.

9. Tube-making apparatus as defined in claim 6 in which the conveyor means is so formed as to bend the strip gradually to a decreasing radius of curvature.

10. Tube-making apparatus comprising means for continuously forming a tubular strip of plastic rubber stock, conveyor means adapted to feed the tubular strip from the forming means into approximately the longitudinally curved form desired in the finished product solely by external engagement with the strip and continuously to deliver the strip from its terminus, and receiving means at the said terminus mounted for rotation to receive a length of the strip in such curved form.

11. Tube-making apparatus as defined in claim 10 including means for rotating the receiving means at a determinate speed with relation to the speed of a conveyor means.

12. Apparatus of the character described comprising stationarily mounted conveyor means for feeding a strip of material into determinately curved form by external engagement of the strip and without full-section internal support thereof and to deliver the strip in such form from its terminus, and receiving means at the said terminus mounted for rotation to receive a length of the strip in curved form.

13. Apparatus as defined in claim 12 including means for rotating the receiving means at a determinate speed with relation to the speed of the conveyor means.

14. Apparatus of the character described comprising means for delivering a strip of material in determinately curved form and means for receiving the strip substantially in such form, the last said means comprising a conveyor, a strip-receiving member adapted to be conveyed thereon, and means for rotatably supporting the said strip-receiving member.

15. Apparatus as defined in claim 14 including means for rotating the strip-receiving member at a determinate speed with relation to that of the strip-delivering means.

16. Apparatus as defined in claim 14 including means for lifting the strip-receiving member from the conveyor, rotatably supporting it over the conveyor, and re-depositing it on the conveyor.

17. Apparatus as defined in claim 14 including a rotatable head mounted to rise through the conveyor to lift the strip-receiving means therefrom, means for holding the head in position to support the strip-receiving means out of contact with the conveyor, and means for rotating the said head.

18. Apparatus of the character described comprising means for supplying a continuous strip of material and means for feeding said strip from the first said means into a determinately curved form, the feeding means comprising a curved series of strip-supporting rollers each tapered toward the inside of the curve.

19. Apparatus as defined in claim 18 including means for driving rollers of the series at determinate relative speed.

In witness whereof I have hereunto set my hand this 6th day of October, 1926.

CHARLES H. SEMPLE.